Aug. 8, 1950 — L. MANDEL — 2,518,347
CAMERA HAVING ROTATABLE LENS AND MIRROR TURRET
Filed Feb. 27, 1946 — 2 Sheets-Sheet 1

Inventor
Louis Mandel
By

Aug. 8, 1950           L. MANDEL           2,518,347
CAMERA HAVING ROTATABLE LENS AND MIRROR TURRET
Filed Feb. 27, 1946           2 Sheets-Sheet 2
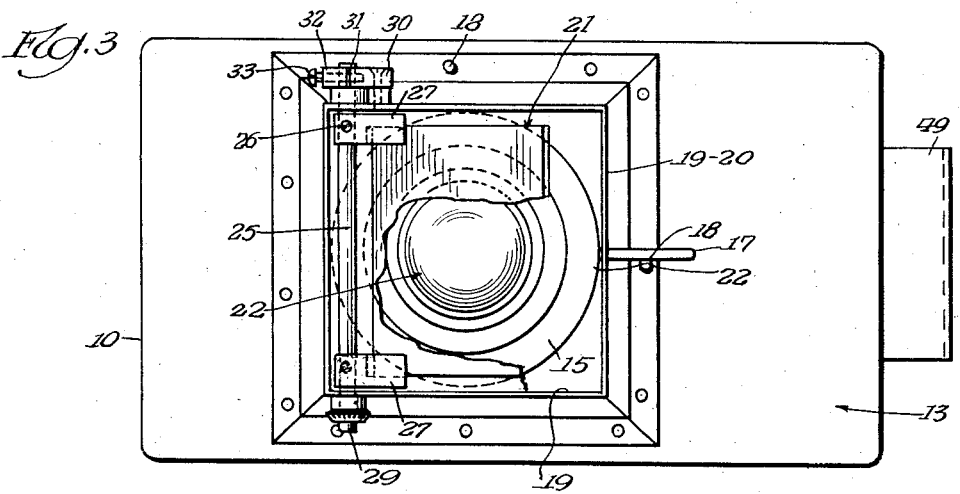
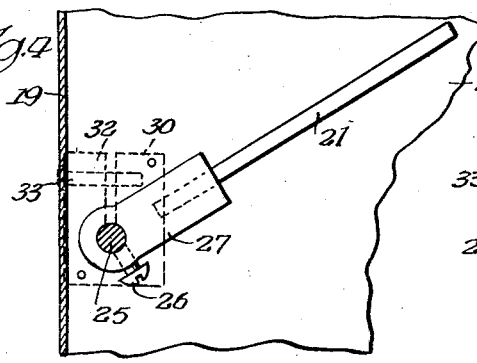
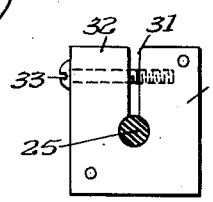
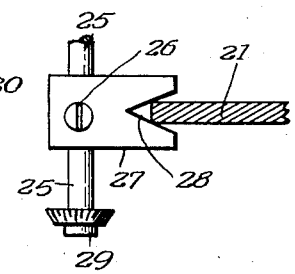
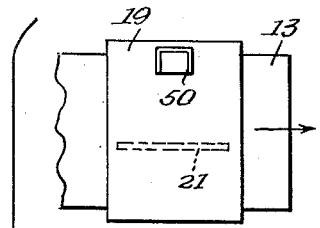
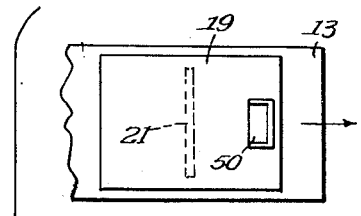
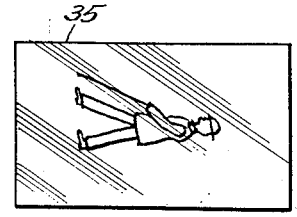
Inventor
Louis Mandel Patented Aug. 8, 1950

2,518,347

UNITED STATES PATENT OFFICE 2,518,347

CAMERA HAVING ROTATABLE LENS AND MIRROR TURRET

Louis Mandel, Chicago, Ill.

Application February 27, 1946, Serial No. 650,464

1 Claim. (Cl. 95—11)

This invention relates to improvements in cameras, and one of the objects of the same is to provide an improved and simple camera whereby a direct positive process is employed, in which no film or plate is used, the picture or image being taken and developed directly upon the positive paper.

Another object is to provide an improved camera of this character, in which any desired number of pictures may be taken upon a roll or supply of paper, which latter, if in a roll, is cut to the desired length, the cut portions being deposited into a magazine, the magazine being removable and portable, so that the exposures may be transported to the place of development without danger of being damaged by exposure to light.

A further object is to provide in a camera of this character, improved means whereby the photographs may be taken either in what is known as "up and down" position; that is, with the short sides of the paper at the top and bottom, or crosswise (i. e., group-wise); that is, with the longer sides of the paper at the top and bottom, without tilting or changing the general position of the camera; that is, with the camera maintained in the same position for each exposure.

A further object is to provide improved means for reflecting or directing the picture rays through a lens onto the sensitized paper.

A still further object is to provide an improved camera of this character, which will be simple in construction, durable, practical to manufacture, and effective and efficient in operation.

To the attainment of these ends and the accomplishment of other new and useful objects as will appear, the invention consists in the features of novelty in substantially the construction, combination and arrangement of the various parts, hereinafter more fully described and claimed, and shown in the accompanying drawings exemplifying this invention, in which Fig. 1 is a vertical sectional view of a camera of this character, embodying this invention, with parts in section and parts in diagram.

Fig. 3 is a top plan view of Fig. 1, with parts broken away and parts omitted.

Fig. 4 is a detail view, partly in elevation and partly in section, of the friction creating means for the reflector, and one of the reflector supports.

Fig. 5 is a detail view of the friction creating means.

Fig. 6 is a detail view of one of the reflector supports, and the operating means for the reflector.

Fig. 7 is a diagrammatic view showing the manner of taking an image crosswise of the film.

Fig. 8 is a view similar to Fig. 7, showing the manner of taking an image lengthwise of the film.

Figure 1:
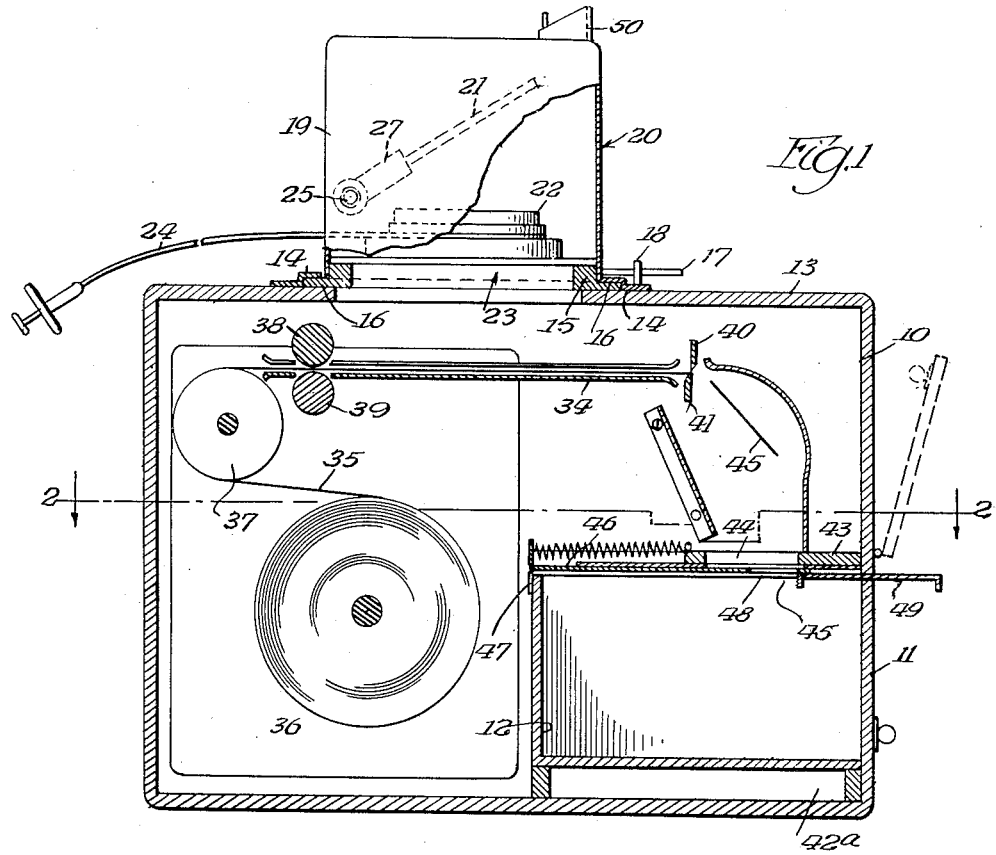
Figure 2:
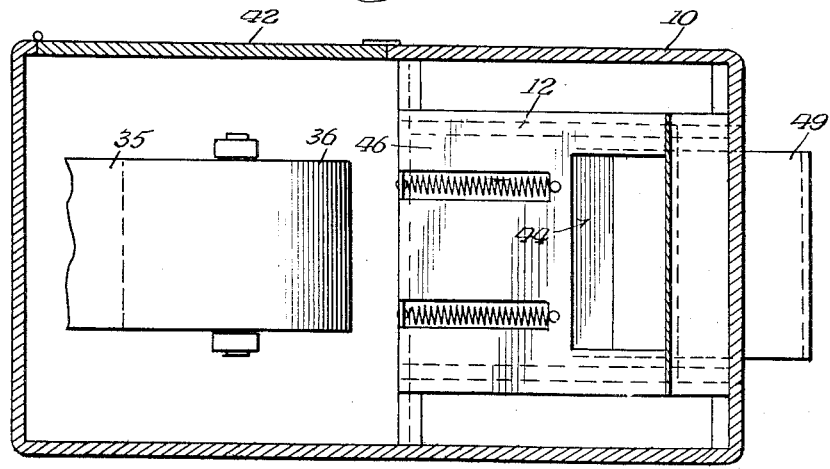
Fig. 2 is a sectional view on line 2—2, Fig. 1, with parts omitted.

Referring more particularly to the drawings, the camera consists essentially of a box or chamber 10, of any desired size and configuration, and constructed of any suitable material. The chamber is preferably rectangular, and is closed except for an entrance door 11, and other openings to be later described. This door may be hinged or mounted to slide, to provide a means whereby a magazine 12, hereinafter more fully described, may be inserted into the chamber and removed therefrom.

Mounted upon the top 13 of the chamber, to revolve freely with respect thereto, such as by means of a guide 14, is a turret base 15, which has a flange 16 that engages thereunder, and is rotatable with respect to the top 13, preferably by means of a handle 17, movable between spaced stops 18, to limit the rotation thereof and to insure that the turret is in the proper position with respect to the film, to produce the desired position of the picture upon the film.

The turret also embodies a body portion 19, which is in the form of a housing, of any desired size and configuration, and which is provided with an open side 20, through which the rays from the object being photographed may strike a reflector 21 within the housing.

A suitable lens 22 is carried by the housing 19, adjacent and in alinement with an opening 23 in the base 15 thereof, so that the rays entering the housing 19 through the open side 20 thereof, and which strike the reflector 21, will be directed into the chamber 10, and onto the film.

A suitable shutter, of any well-known type and construction, controls the opening 23, and any suitable form of release, such as the usual cable release 24, may be provided to control the operation of the shutter.

The reflector 21 may be of any desired or suitable construction, such as a mirror, prism, or any body of material having a highly polished reflecting surface, for correcting "reversed" photographs.

In the present exemplification of the invention, the reflector is disclosed as a mirror, and is mounted upon a shaft 25, journaled in a suitable bearing at one side of the housing 19. The shaft has secured to it for movement therewith, such as by means of a screw 26, a holder 27 having a groove 28 therein to receive one edge of the reflector 21. This groove preferably decreases in width from the edge of the holder 27 to the opposite edge, to insure a proper fit and holding of the edge of the reflector. The shaft 25 is preferably provided with an operating knob or handle 29, by means of which the reflector may be swung about its pivot. The other side of the reflector may be similarly supported, and co-operating with the shaft on the last said side of the mirror is a suitable clamp or brake device embodying a body portion 30, suitably supported and split, as at 31, to form a yielding or adjustable portion 32. A screw 33 is provided to adjust the part 32, to vary the tension of the brake member, and to maintain the reflector in its adjusted position and against accidental displacement. Any other suitable means may, however, be provided to accomplish these ends.

The reflector 21 is of any suitable size, and is disposed above the lens 22, to extend transversely across the housing 19 and the open side 20 thereof, and is adapted to be positioned by the operator to receive the rays from the object being photographed, as will be later described.

Within the chamber 10, and beneath the opening 23 of the turret, and in alinement with the lens 22 to extend thereacross, but spaced from the lens, is a sensitized film support 34, suitably supported and of any desired configuration, but preferably being provided with grooves or guideways along its sides to receive and guide the film 35. The film is preferably supplied from a roll 36, suitably mounted in the chamber 10, to pass over a guide roller 37, to be fed along the guide and support 34 by feed rollers 38—39, suitably operated, preferably by means of a turning knob or handle on the outside of the chamber 10 (not shown).

Any suitable means may be provided for cutting the film into lengths, after exposure has been made on the portion to be severed. Such a means may embody co-operating cutting elements 40—41 arranged adjacent the end of the film guide and support 34, and may be operated in any suitable manner from the outside of the chamber 10, by means located in a convenient position for the operator.

A door or closure 42, suitably mounted, is provided to close an opening in the wall of the chamber 10, through which opening the film roll 36 may be placed in position, and through which opening access may be readily had to the mechanism and parts within the chamber.

Within the chamber 10 is arranged a compartment 42a, provided with a top 43, which latter has an opening 44 therethrough, positioned to receive the portion 45 of the film that is cut from the supply, after exposure. When the film is cut, the severed portion will drop into the magazine 12 through the opening 44. A spring controlled slide 46 serves as a closure for the opening 44, and automatically moves into closing position when the magazine 12 is withdrawn through the opening that is closed by the closure 11. This slide 46 is provided with a downwardly extending flange or lip 47 which, when the magazine is removed, will assume a position in the path of movement of one end of the magazine when the latter is being placed back into the camera. At this time the edge of the magazine engaging this lip or flange will slide the closure 47 against the stress of the resilient closing means, to uncover the opening 44, so that the severed portion 45 of the film can drop into the magazine. A suitable fastening device may be provided to lock the magazine against being pushed out of position by the said resilient means, and to hold the magazine against accidental displacement.

The magazine 12 is provided with an entrance opening 48, adapted to be closed by a slide or closure 49 carried by the magazine, and which is of any suitable construction, so that before the magazine is removed from the compartment 42a, the opening 48 may be closed, to prevent unwanted rays of light from causing damage to the exposed films. When the magazine is in position in the camera, the slide 49 is adjusted to uncover the opening 48.

Any suitable finder 50 may be provided on the housing 19.

In use, the operation, briefly stated, is as follows:

When the magazine 12 is in position and the opening 48 therein is uncovered, the camera is sighted or aimed by means of the finder 50, and the reflector 21 is positioned according to the position it is desired to have the object appear upon, and with respect to the film. That is, whether the long or short side of the film is to be the top of the picture. The reflector 21 is then adjusted about its pivot, and in directions towards or away from the lens 22, for obtaining the necessary height of the object being photographed. The shutter is then operated to take the picture. After exposure, the film is advanced upon the guide and support 34 to a position with respect to the cutters 40—41. The cutters are then operated to sever the portion 45 of the film, so that such portion may drop into the magazine 12. When the desired number of films accumulate in the magazine, it is closed by adjusting the closure 49, after which the magazine is removed from the compartment 42a. During the removal of the magazine, the closure or slide 46 will be automatically operated to close the opening 44.

This camera may be placed upon a rigid support or table in a level position, without the necessity of being raised, lowered or tilted. The reflecting element or mirror is the only part of the camera that requires adjustment, to obtain the desired height of the object to be photographed. The revolving turret laterally scans the objects to be photographed. Thus, by means of the revolving turret and tiltable reflector, objects within range can be quickly "located" for being photographed.

While the preferred form of the invention has been herein shown and described, it is to be understood that various changes may be made in the details of construction, and in the combination and arrangement of the several parts, within the scope of the claim, without departing from the spirit of this invention.

What is claimed as new is:

A camera comprising a closed box having an opening in its top, a guide member mounted on the top of said box and surrounding said opening, a turret embodying a turret base and a hollow housing mounted on said turret base, said turret base being encircled by said guide member and rotatably mounted between said guide member and the top of said box, a lens carried by said turret base, said housing having an opening in one side thereof through which light rays may enter, a handle secured to said turret for rotating said turret about a vertical axis, spaced stops adapted to be engaged by said handle to limit the rotation of said turret, a reflector in said housing for directing the light rays through said lens, a horizontal rotatable shaft journaled in said housing and extending transversely with respect to the axis of said lens, holder members secured to said shaft and having V-shaped grooves formed therein to receive and hold one edge of the reflector, an operating knob secured to said shaft for rotating said shaft and said reflector through a very small angle, and a brake device acting on said shaft to hold the reflector in any selected position, said brake device consisting of a body mounted on said housing and having an opening therein through which said shaft passes, said body being split between one side thereof and the opening therein to form a yieldable portion on the body, and an adjusting screw for varying the pressure of the yieldable portion exerted on the shaft to maintain the reflector in adjusted position.

LOUIS MANDEL.

REFERENCES CITED

The following references are of record in the file of this patent:

UNITED STATES PATENTS

| Number | Name | Date |
|---|---|---|
| 866,257 | Case | Sept. 17, 1907 |
| 1,273,183 | Ramsey | July 23, 1918 |
| 1,411,689 | Frederick et al. | Apr. 4, 1922 |
| 1,940,187 | Salchow | Dec. 19, 1933 |
| 1,997,130 | Weisse | Apr. 9, 1935 |
| 2,043,539 | Harrison et al. | June 9, 1936 |
| 2,245,522 | Bernhard et al. | June 10, 1941 |

FOREIGN PATENTS

| Number | Country | Date |
|---|---|---|
| 489,691 | France | Oct. 22, 1918 |
| 509,674 | Germany | Oct. 11, 1930 |
| 736,537 | France | Sept. 19, 1932 |